United States Patent [19]

Ohtake et al.

[11] Patent Number: 4,662,984

[45] Date of Patent: May 5, 1987

[54] METHOD OF MANUFACTURING SHADOW MASK

[75] Inventors: Yasuhisa Ohtake, Fukaya; Makoto Kudou, Kumagaya; Yasushi Sengoku, Fukaya, all of Japan

[73] Assignee: Kabushiki Kaisha Toshiba, Kawasaki, Japan

[21] Appl. No.: 769,885

[22] Filed: Aug. 27, 1985

[30] Foreign Application Priority Data

Aug. 30, 1984 [JP] Japan ............................ 59-179247

[51] Int. Cl.[4] ........................ C23F 1/02; B44C 1/22; C03C 15/00; C03C 25/06

[52] U.S. Cl. ................................ 156/637; 156/345; 156/640; 156/644; 156/651; 156/656; 156/661.1; 204/129.55; 313/403; 428/596; 430/23

[58] Field of Search .............. 156/345, 637, 639, 640, 156/644, 651, 656, 659.1, 661.1; 430/23, 28; 313/402, 403; 428/566, 596, 131, 134–136; 204/129.55, 129.6, 129.65

[56] References Cited

U.S. PATENT DOCUMENTS

| | | | |
|---|---|---|---|
| 2,226,383 | 12/1940 | Norris | 156/644 X |
| 2,961,314 | 11/1960 | Amdursky et al. | 156/644 X |
| 4,013,498 | 3/1977 | Frantzen et al. | 156/640 X |
| 4,069,085 | 1/1978 | Buysman et al. | 156/640 X |
| 4,124,437 | 11/1978 | Bond et al. | 156/644 X |
| 4,357,196 | 11/1982 | Tanaka et al. | 156/644 X |
| 4,425,183 | 1/1984 | Maheras et al. | 156/651 |

FOREIGN PATENT DOCUMENTS

| | | |
|---|---|---|
| 2046417 | 5/1971 | France . |
| 2278150 | 6/1975 | France . |

*Primary Examiner*—William A. Powell
*Attorney, Agent, or Firm*—Cushman, Darby & Cushman

[57] ABSTRACT

A method of perforating through pores by etching in the manufacture of a shadow mask. This perforating method comprises the steps of selectively covering both surfaces of a thin metal plate with etching resistant film except a predetermined pore region; performing an etching to form recesses on the opening region of one surface of the metal plate; covering the one surface of the metal plate with an etching resistance material; etching the opening region of the other surface of the metal plate until the bottom of the etching resistance material buried in the recesses of the one surface of the metal plate is exposed; exposing both surfaces of the metal plate including the through holes by removing the etching resistant film and the etching resistant material; and etching the exposed surfaces of the metal plate again by contacting the exposed surface with an etchant.

12 Claims, 11 Drawing Figures

METHOD OF MANUFACTURING SHADOW MASK

BACKGROUND OF THE INVENTION a. Field of the Invention

This invention relates to a method of manufacturing a shadow mask for use in a color picture tube and, more particularly, to the step of etching a metal plate.

b. Description of the Prior Art

A shadow mask is positioned close to, and facing, a phosphor screen for emitting rays of different colors. It comprises a metal plate with a number of through holes made by etching the plate and arranged in a specific pattern. These holes guide the electron beams emitted from electron guns to the phosphor dots formed on the phosphor screen. Hence, the shadow mask, so to speak, sorts colors. Each hole widens on the side of the mask which faces the phosphor screen.

Hitherto, to make through holes in such a metal plate, an etchant was either applied on only one surface of the plate, or on both surfaces. In either case, the smaller the holes, the harder it is to perforate them with sufficient precision. In fact, it is extremely hard to make holes having diameters less than the thickness of the metal plate.

Japanese Patent Publication No. 26345/1982 discloses a method which can etch a metal plate and can thereby perforate holes therein, whose diameters are less than the thickness of the plate. In this method, as shown in FIG. 2(A), a resist layer 4 with small openings (only one hole being shown) is formed on the upper surface 2 of a metal plate 1, and another resist layer 5 with large openings (only one being shown) is formed on the lower surface 3 of the plate 1. Then, an etchant is applied on both surfaces of the metal plate 1 in the zone (a) of the manufacturing system in FIG. 1, thereby forming a small hole Db in the upper surface 2 and a large hole Da in the lower surface as shown in FIG. 2(B). At this stage, the thickness of the etched portion of the plate 1 is H. The unfinished product is then washed with water in the zone (b) of the manufacturing system, and is subsequently dried in the zone (c). A material resistant to the etchant, such as asphalt, paraffin or polymer plastic, is sprayed onto the upper surface 2 of the plate 1 in the zone (d) of the system, thus forming an etchant-resistant layer 6 covering the resist layer 4 and filling the small hole Db. As shown in FIG. 2(C), the etchant is applied to only the lower 3 surfaces of the plate 1 until the hole Da becomes deeper in the zone (f), reaching the layer 6 and acquiring the desired size. Then, the unfinished product is washed with water and dried. It is carried to the zone (g), where the layer 6 and both resist layers 4 and 5 are removed. As a result, a through hole is formed as shown in FIG. 2(D). It is said that this method can perforate holes whose diameter is about 40% of the thickness of the metal plate 1.

Generally, in manufacturing a shadow mask, the etching proceeds in the horizontal direction in a metal plate while proceeding in the vertical direction. How much the horizontal etching, i.e., "side etching," must be controlled is of vital importance. Equally important is the etching which ultimately determines the diameter of the through holes. Unless the side etching is properly controlled, the holes will become too large. To prevent this, a relatively small opening may be formed in a resist layer. It follows, however, that the pattern used to make the layer 4 on the metal plate must be fine. Here arises a problem. The finer the pattern, the greater the difference in diameter which occurs among the openings of the resist layer, and hence, among the through holes of the shadow mask.

In view of this, the method shown in FIG. 1 is advantageous. As stated above, the etchant-resisant layer 6 which is formed immediately after the small hole Db, and which ultimately determines the diameter of the through hole, has been cut in the upper surface region of the metal plate 1. Therefore, the hole Db does not expand in the horizontal direction when the large hole Da is further etched in the second etching step.

The cross-sectional shape of the small-diameter portion of each through hole is important since it greatly influences the diameter of the electron beam passing through the mask when a beam is obliquely applied to the mask. FIG. 3 is a plan view of a shadow mask as looked at from the phosphor screen. As shown in this figure, this shadow mask has rectangular holes. The cross section of each hole taken along line A—A (hereinafter called "slit section") and the cross section thereof taken along line B—B (hereinafter called "bridge section") have different shapes. When each hole is made by the method shown in FIGS. 1 and 2(A)–2(D), the slit section will have such a shape as is shown in FIG. 4(B). The wall of the hole vertically rises for a distance t from the small opening 2 toward the large opening 3. Unlike the ideal slit section shown in FIG. 4(A), the slit section of FIG. 4(B) inevitably prevents some portion of the incident electron beam $e^-$ from passing through the hole. The larger the thickness t, the greater the ratio of the beam that cannot pass through the hole. To make matters worse, electrons impinging on and bouncing from the vertical wall of the hole may pass through the other holes and thus may reach the phosphor dots other than the target dot, thereby darkening the image and impairing the contrast of the image. This undesirable phenomenon is particularly prominent at the edge portions of the TV screen.

In FIG. 5(B), one bridge section of the shadow mask manufactured by the method of FIG. 1 is shown, and FIG. 5(A) shows the bridge section of the ideal shape. The horizontal distance W between the inner periphery of the narrowest portion of one hole made by the method of FIG. 1 and that of the narrowest portion of the adjacent hole also made by the same method is long, in comparison with the shadow having the bridge section of the ideal shape. As may clearly be understood from FIG. 5(B), a smaller portion of an electron beam passes through each hole of the mask manufactured by the method of FIG. 1 than through each hole of the mask shown in FIG. 5(A). This results in a reduction of the TV screen brightness. Further, this will deteriorate the quality of the phosphor screen. More specifically, the electron beams passing through the holes of the shadow mask are used to form light-absorbing "black stripes" on the screen plate, among the phosphor dots. Since the diameter of each beam passing through the shadow mask made by the method of FIG. 1 is insufficient for the reason mentioned above, more black stripes will have neck portions than otherwise, affecting the quality of the phosphor screen.

SUMMARY OF THE INVENTION

An object of this invention is to provide a method of manufacturing shadow masks which permits the etching of uniform openings having a smaller diameter than the thickness of a metallic plate and an optimum sectional shape for passing an electron beam.

According to an aspect of the present invention, there is provided a method of manufacturing shadow masks comprising the steps of covering a portion except a predetermined opening region of front and back surfaces of a thin metallic plate with etching resistant film; performing a first etching to form recesses on one surface of the thin metallic plate to be perforated; covering said one surface of the thin metallic plate including the recesses with an etching resistance material; and performing a second etching on another surface which is opposite to said one surface of the thin metallic plate until the bottom of the etching resistance material in the recesses of said one surface is exposed, thereby perforating a number of through holes arranged regularly and each having a different opening size on said one surface from that on said another surface, an improvement of which comprises the steps of:

exposing both said one surface and another surface of the thin metallic plate including the through holes by removing the etching resistant film and the etching resistance material after the second etching step; and performing a third etching to etch the exposed surfaces again by contacting the exposed surface with an etchant.

DETAILED DESCRIPTION OF THE PREFERRED EMBODIMENTS

A method of manufacturing shadow masks according to the present invention will be described with reference to the accompanying drawings.

Figure 6:
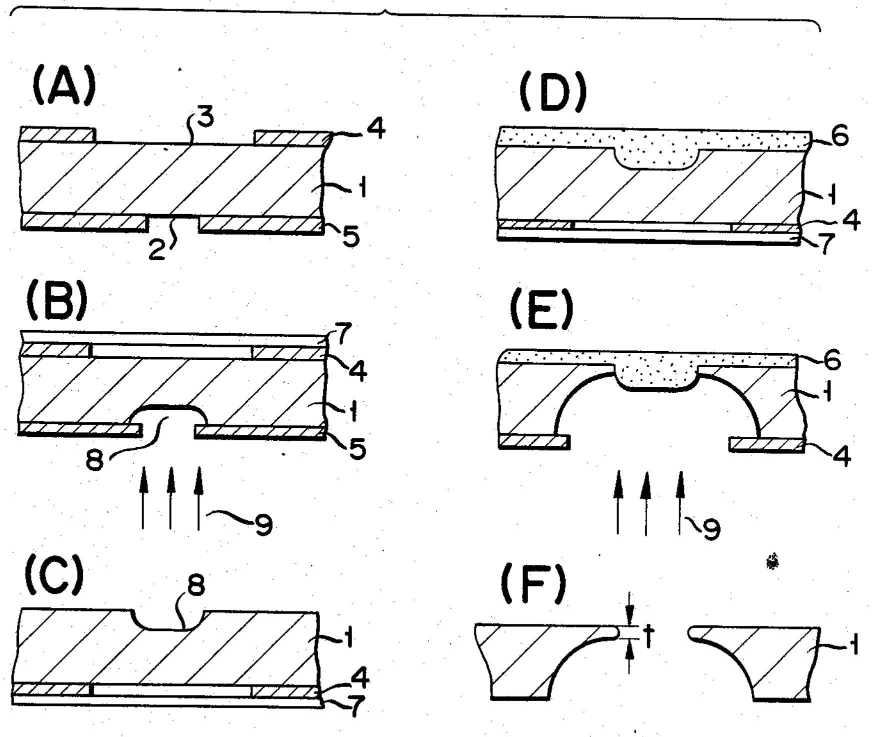
FIGS. 6(A) to 6(F) are sectional views of the thin metallic plate for exhibiting the steps in order to manufacture shadow masks according to the present invention.

A resist film having a thickness of approx. 5 μm was formed by employing as a shadow mask material a smooth aluminum killed low carbon steel plate 1 having a thickness of 0.13 mm, and coating and drying a photosensitive solution prepared by mixing a milk caseinic acid alkali and ammonium bichromate on both side main surfaces of the plate 1. Then, a negative plate, having a number of smaller dot images each being approx. 80 μm in diameter, was closely disposed on one main surface of the plate 1, and a negative plate having a number of larger dot images, each being approx. 150 μm in diameter was closely disposed on the other main surface of the plate 1 to correspond to each one of the smaller circular images, and the both negative plates were exposed by a mercury lamp having 5 KW at a distance of 1 m for 30 sec. Thereafter, the unexposed uncured portion of the resist film was dissolved by a spraying pressure of 1 kg/cm$^2$ of hot water at 40° C., and removed, thereby exposing the metallic surfaces to be formed with smaller and larger openings (FIG. 6(A)). Subsequently, in order to improve the etching resistance of the remaining resist films 4 and 5 and the bonding strength to the metallic plate 1, the films were dried with atmospheric air of 150° C. for approx. 2 min., and burnt with atmospheric air of 200° C. for approx. 2 min. Then, a protective film 7 of polyethylene, polypropylene or vinyl chloride was bonded to the larger opening side, i.e., the upper surface of the metallic plate 1 (FIG. 6(B)). An etchant 9 was sprayed only to the smaller opening side, i.e., the back surface of the metallic plate 1 to perform a first etching until a recess 8 having a depth of approx. 30 μm was formed (FIG. 7(*a*)), and then the etched surface was washed with water (FIG. 7(*b*)). The etchant employed was a ferric chloride solution having a specific weight of 1.45 to 1.49 and temperature of 50° to 70° C. The etchant was sprayed at the spraying pressure of 1 to 2 kg/cm$^2$. Then, while the film 7 was bonded to the larger opening side, a sodium hydroxide solution having 15% of concentration at 60° C. was sprayed from the smaller opening side to remove the resist film 4 remaining on the smaller opening side (FIG. 7(*c*)). Thereafter, the smaller opening side was washed with water (FIG. 7(*d*)). Then, after the metallic plate 1 was overturned (FIG. 6(*c*)) to dispose upward the surface having the recesses 8 formed by the first etching, a water soluble etching resistance material such as, for example, milk caseinic acid alkali, polyvinyl alcohol, epoxy dispersion resin or alkyd resin was coated by a roller coater on this surface (FIG. 7(*e*)) to completely bury the recesses 8 in the smaller opening side, to then dry the etching resistance material (FIG. 7(*f*)), thereby forming a resistance layer 6 (FIG. 6(D)). Since, in this case, water remaining in the recesses 8 may not be rapidly substituted by the etching resistance material depending on the type thereof, if the metallic plate is moistened, the coating of the etching resistance material should preferably be performed after the recesses are washed with water and dried. The film of the etching resistance material was preferably formed in a range of 5 to 10 μm thick (on a dry basis) on the surface of the metallic plate out of the recesses 8. The coating method of the resistance material may include, for example, in addition to the roller coating method, a knife coating method, a spraying method, a dipping method or a bar coating method. The resistance material is required to have a good etching resistance, and may include, for example, in addition to the above-mentioned materials, non-water soluble materials such as paraffin, petroleum pitch, or lacquer. If such a non-water soluble material is to be employed, the resistance layer 6 should preferably be coated after removing the resist film 5 remaining on the smaller opening side, washing the film with water, and then drying the surface of the plate 1. Following the coating step of the resistance layer 6, the protective film 7 on the larger opening side was removed and an etchant 9 made of ferric chloride was sprayed only on the larger opening side disposed downward to perform a second etching (FIG. 7(*g*)), until the large opening recesses reached to the layer 6, thereby forming openings of a prescribed size in the shadow mask. Then, after washing with water (FIG. 7(*h*)), the resistance layer 6 and the protective film 4 were removed (FIG. 7(*i*)), thereby finishing the opening forming step (FIG. 6(F)).

The etching amount in the first etching or in the second etching may be varied depending on the dimension of the openings of the shadow mask and the thickness of the metallic plate. In any case, the etching amount in the second etching is necessarily larger than that in the first etching. Therefore, in order to provide the optimum etching amount in the first and second etching steps, the relative lengths of the etching chambers between the first and second etchings may be adequately adjusted, or the specific weight, temperature or spraying pressure of the etchant to be employed in these etching steps may be adequately adjusted.

Figure 1:
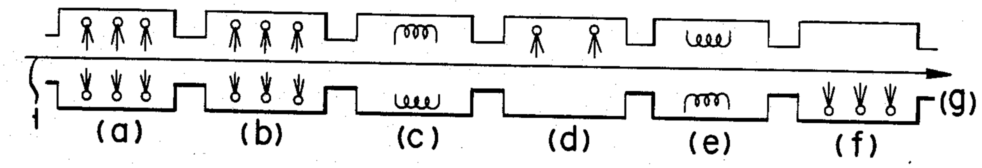
FIG. 1 is a schematic view showing the steps of manufacturing a conventional shadow mask.
Figure 2:
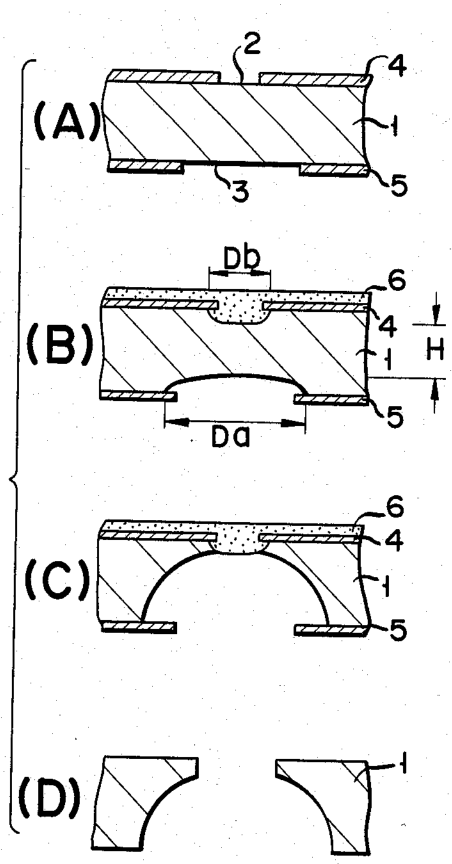
FIGS. 2(A) to 2(D) are sectional views showing the etching step of a thin metallic plate corresponding to the manufacturing step of FIG. 1.
Figure 3:
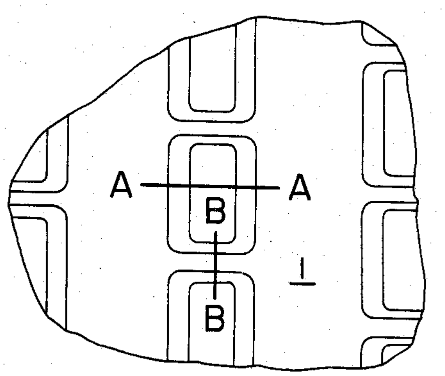
FIG. 3 is a plan view partly showing the shadow mask having rectangular penetrating pores.
Figure 4A:
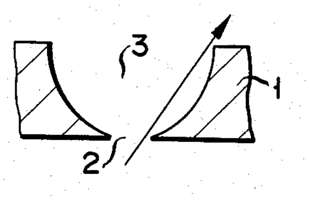
FIGS. 4(A) and 4(B) are sectional views of a slit taken along the line A—A of FIG. 3.
Figure 4B:
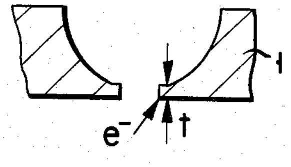

The sectional shape of the openings thus obtained has, as shown in FIG. 6(F), a wall having a height (t) at the communicating portion between the smaller pore and the larger opening as in the case of FIG. 4(B).

Figure 5A:
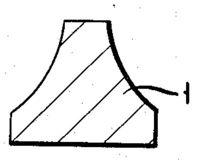
FIGS. 5(A) and 5(B) are sectional views of the bridge taken along the line B—B of FIG. 3.
Figure 7:
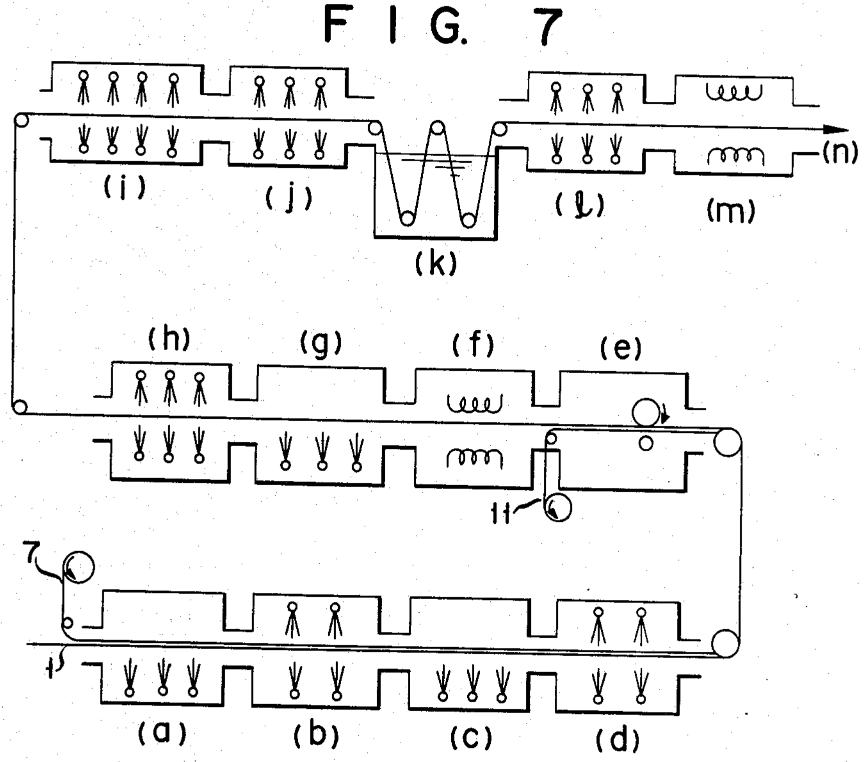
FIG. 7 is a schematic view showing the etching step corresponding to the steps of (A) to (F)

Upon completion of the first and second etching steps, both surfaces of the metallic plate 1 were washed with water (FIG. 7(*j*)), and introduced again to an etching tank (FIG. 7(*k*)). This third etching step may be conducted by a spraying method or by a dipping method. The spraying method is superior in etching efficiency due to a strong physical impact of the etchant, and can accordingly reduce the dimensions of the height (t) or width (w) shown in FIG. 4 or 5. However, the dimension of the openings is likely to become larger than desired, and an irregularity tends to occur due to the nonuniform accumulation of the etchant or nonuniform impact of the spraying pattern on the metallic plate. On the other hand, the dipping method does not have a problem like the spraying method, and therefore is suitable for etching. However, in the case of the dipping method, when the exchange of the fatigued solution with a new solution on the etched surfaces is not appropriate, the etching velocity will decrease. Therefore it is preferable to carry out the dipping while agitating the etchant. The agitation may be conducted preferably by a supersonic method, a bubbling method, or an agitating method, and among then the supersonic method is most preferable in view of the agitating efficiency.

After the third etching, the metallic plate is washed with water (FIG. 7(*l*)), dried (FIG. 7(*m*)), fed to the next step of cutting (FIG. 7(*n*)) to be punched to produce a flat mask. The dipping apparatus used in the third etching step shown in FIG. 7, can also be used for the ordinary etching step by raising the metal plateholding rollers above the etchant.

Figure 5B:
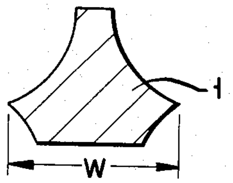
Figure 8A:
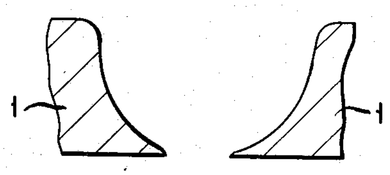
FIGS. 8(A) and 8(B) are sectional views of the list of a rectangular shape and a bridge taken along the lines A—A, and B—B of FIG. 3 of the shadow masks provided in accordance with the invention.
Figure 8B:
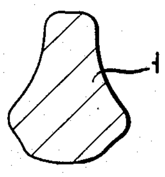

FIG. 8 schematically shows the sectional shape of rectangular openings of the shadow mask as manufactured according to this invention, which corresponds in shape to FIGS. 4(B) and 5(B). As far as the cross-sectional view of the slit is concerned the wall (t) at the junction of the larger and smaller openings has substantially vanished as shown in FIG. 8(A). On the other hand, with respect to the bridge cross-section, the junction between the larger opening and the smaller opening is free from any acute projection, thereby achieving the reduction of width (w) as shown in FIG. 8(B).

In the embodiments described above, the portion of the larger opening region 3 is covered in advance with the etching resistant film 7, and then only the portion of the smaller opening region 2 is etched in the first etching step. This etching process effectively prevents the resist film 4 from being attacked twice with the etchant in the first and second etching steps, thereby avoiding the damage of the resist film 4 and keeping the accuracy of the resist pattern. If the slight decrease in the accuracy of the resist pattern is allowed or is of no problem, the first etching of the plate may be conducted on both surfaces thereof.

In the embodiments described above, the resist film 5 is removed in advance and the resistance layer 6 is then formed in the recesses of the smaller opening side of the plate. Because, when the layer 6 is coated without removing the resist film 5, it becomes difficult to completely fill the recesses, or takes a long time to fill the recesses, due to the presence of the resist film 5 partly overhanging the recesses. If the resistance layer 6 is insufficiently filled in the recesses, it might decrease the etching accuracy. However, if it is possible to sufficiently fill the resistance layer 6 in the recesses without removing the resist film 5, the step of removing the film 5 may be omitted.

According to the present invention as described above, the openings having a smaller diameter than the thickness of the thin metallic base plate and an optical cross-section for the passage of an electron beam can be uniformly perforated. Therefore, it is possible according to this invention to provide a shadow mask which has no bad influence on the intensity and contrast of a color picture tube.

What is claimed is:

1. Method of manufacturing a shadow mask comprising the steps of:

(a) covering a thin metallic plate, on each a first and second side of said plate, with an etchant resistant film, said film having openings therethrough of predetermined size, which openings are aligned from said first to said second side;

(b) in a first etching step, etching said first side of said plate so as to form recesses therein;

(c) applying an etchant resistant material to said first side of said plate so as to completely cover said side, including said recesses;

(d) in a second etching step, etching said second side of said plate so as to etch exposed portions thereof until the bottom of the etchant resistant material which has been applied to said first side is exposed, thereby forming a number of perforations through said sheet;

(e) removing both the etchant resistant material and the etchant resistant film from said first and second sides of the plate, respectively; and (f) in a third etching step, etching both of said first and second sides so as to form regularly arranged perforations of uniform cross-sectional shape and area.

2. Method according to claim 1 wherein said third etching step is performed by a dipping method.

3. Method according to claim 1 wherein said second side of said thin metallic plate is completely covered before said first side is etched.

4. Method according to claim 1 further comprising the step of removing the etchant resistant film from said first side after said first etching before said etchant resistant material is applied.

5. A method according to claim 1, wherein the third etching is performed by a dipping method in an etchant tank.

6. A method according to claim 5, wherein the dipping method is performed while agitating the etchant in the etchant tank.

7. A method according to claim 6, wherein the agitating is performed by a supersonic wave.

8. A method according to claim 5, wherein the third etching is performed by an electrolytic etching.

9. A method according to claim 1, wherein the third etching is performed by a spray etching.

10. Method according to claim 1 wherein said etchant resistant material applied to said first side after said first etching completely fills the recesses formed in said first side.

11. Method according to claim 1 wherein the recesses formed in said first etching step are of smaller cross-sectional area as measured at the surface of the plate than those recesses formed on said second side.

12. Method of manufacturing a shadow mask comprising the steps of:

(a) covering a thin metallic plate, on each a first and second side thereof with an etchant resistant film, said film having openings therethrough of a predetermined size, which openings are aligned from said first to said second side;

(b) in a first etching step, etching said first side of said plate so as to form recesses therein;

(c) removing said etchant resistant film from said first side which has been etched;

(d) applying an etchant resistant material to said first side of said plate so as to completely cover said side and fill said recesses;

(e) in a second etching step, etching said second side of said plate so as to etch exposed portions thereof until the bottom of the etchant resistant material is exposed, thereby forming a number of perforations through said sheet, the recesses formed in the first etching step being of smaller cross-sectional area than those formed in this second etching step as measured at the surface of each side;

(f) removing both the etchant resistant material and the etchant resistant film from said first and second sides of the plate, respectively; and (g) in a third etching step, etching both of said first and second sides so as to form regularly arranged perforations of uniform cross-sectional shape and area.

* * * * *